US010181909B2

(12) United States Patent
Yu

(10) Patent No.: US 10,181,909 B2
(45) Date of Patent: Jan. 15, 2019

(54) METHOD AND APPARATUS FOR OPTICAL WIRELESS ARCHITECTURE

(75) Inventor: Jianjun Yu, Princeton, NJ (US)

(73) Assignees: ZTE CORPORATION (CHINA), Shenzhen (CN); ZTE (USA) Inc., Richardson, TX (US)

( * ) Notice: Subject to any disclaimer, the term of this patent is extended or adjusted under 35 U.S.C. 154(b) by 0 days.

(21) Appl. No.: 13/284,561

(22) Filed: Oct. 28, 2011

(65) Prior Publication Data
US 2012/0106973 A1 May 3, 2012

Related U.S. Application Data

(60) Provisional application No. 61/408,005, filed on Oct. 29, 2010.

(51) Int. Cl.
H04B 10/10 (2006.01)
H04B 10/02 (2006.01)
H04B 10/90 (2013.01)

(52) U.S. Cl.
CPC ....... H04B 10/90 (2013.01); *H04B 2210/006* (2013.01)

(58) Field of Classification Search
CPC .. H04B 10/90; H04B 2210/006; H04B 10/11; H04B 10/1129
USPC ........................................................ 398/115
See application file for complete search history.

(56) References Cited

U.S. PATENT DOCUMENTS 8,331,798 B2 * 12/2012 Arahira .......................... 398/188
8,373,921 B2 * 2/2013 Ridgway ....................... 359/279

2003/0058108 A1 * 3/2003 Fling et al. ................ 340/572.1
2007/0206957 A1 * 9/2007 Shoji et al. ................... 398/183
2007/0292142 A1 * 12/2007 Hashimoto et al. .......... 398/186
(Continued)

FOREIGN PATENT DOCUMENTS

CN 101001126 A 7/2007
CN 101043274 A 9/2007
(Continued)

OTHER PUBLICATIONS

IEEE photonics technology letters, vol. 17. No. 9, Sep. 2005, Fiber-optic 40-GHz mm-wave link with 2.5-Gb/s data transmission.*
(Continued)

*Primary Examiner* — Mina Shalaby
(74) *Attorney, Agent, or Firm* — Drinker Biddle & Reath LLP

(57) ABSTRACT

Embodiments of the present invention pertain to optical wireless architecture. More particularly, certain embodiments of the invention pertain to a novel method and apparatus to generate millimeter-wave signals with simple and/or low cost architecture. Simple millimeter-wave generation and dispersion-tolerant transmission is based on photonic mixing of two free-running lightwaves and self-mixing down-conversion. More particularly, heterodyne mixing of two free run lightwaves is achieved, wherein one lightwave is modulated by an external modulator driven by electrical data as one of the side-bands of a millimeter-wave signal. Optical to electrical conversion is performed and the millimeter-wave signal is broadcasted by a high-frequency antenna to a receiving side having a local oscillator with self-mixing architecture to down-convert the radio frequency to its baseband form.

1 Claim, 7 Drawing Sheets

The evaluation platform of free-run Millimeter-wave signal transmission

(56) References Cited

U.S. PATENT DOCUMENTS

| | | | |
|---|---|---|---|
| 2008/0298813 A1* | 12/2008 | Song et al. | 398/178 |
| 2011/0013914 A1* | 1/2011 | Lowery | 398/158 |
| 2011/0200076 A1* | 8/2011 | Mu et al. | 375/219 |
| 2011/0206383 A1* | 8/2011 | Chien et al. | 398/187 |

FOREIGN PATENT DOCUMENTS

| | | |
|---|---|---|
| CN | 101079670 A | 11/2007 |
| CN | 101713900 A | 5/2010 |
| CN | 101777953 A | 7/2010 |

OTHER PUBLICATIONS

A Low-Voltage Low-Power Self-mixer for 3.1-5GHz Non-coherent UWB Receiver, 2009 Wei Wu, Xiaoya Fan, Tingcun Wei, Cameron T. Charles, School of Computer, Northwestern Polytechnical University Xi an, Shaanxi,710072, P.R.China, Department of Electrical and Computer Engineering University of Utah, Salt Lake City, Utah 84102-9206, U.S.A.*

A novel duplex radio-over-fiber system simultaneously transmit baseband signal, Zhang Qian., Pan Wei, Yan Hill, Luo Bin, Southwest Jiaotong Ulaiversity, School of Information Science and Technology, Chengdu 610031, 2009.*

Yu, J., et al., *A Novel Scheme to Generate Single-Sideband Millimeter-Wave Signals by Using Low-Frequency Local Oscillator Signal* (Apr. 2008), vol. 20, No. 7, IEEE Photonics Technology Letters, pp. 478-478.

Chang, G., et al., *Broadband Access Technologies for Very High Throughput Wireless Sensor Communication Networks* (2010), Georgia Institute of Technology and Beijing University of Post & Telecommunications, pp. 496-499.

Jian, W., et al., *Energy-Efficient Multi-Access Technologies for Very-High-Throughput Avionic Millimeter Wave, Wireless Sensor Communication Networks* (Aug. 15, 2010), vol. 28, No. 16, Journal of Lightwave Technology, pp. 2398-2405.

Song, H., et al., *Error-Free Simultaneous All-Optical Upconversion of WDM Radio-Over-Fiber Signals* (Aug. 2005), vol. 17, No. 8, IEEE Photonics Technology Letters, pp. 1731-1733.

Wiberg, A., et al. *Fiber-Optic 40-GHz mm-Wave Link with 2.5-Gb/s Data Transmission* (Sep. 2005), vol. 17, No. 9, IEEE Photonics Technology Letters, pp. 1938-1940.

Yu, J., et al., *Optical Millimeter-Wave Generation or Up-Conversion Using External Modulators* (Jan. 1, 2006), vol. 18, No. 1, IEEE Photonics Technology Letters, pp. 265-267.

Qian, Zhang et al., "A novel duplex Radio-over-Fiber system simultaneously transmit baseband signal", Optical Communication Technology, China Academic Journal Electronic Publishing House, Dec. 2009, pp. 49-51.

* cited by examiner

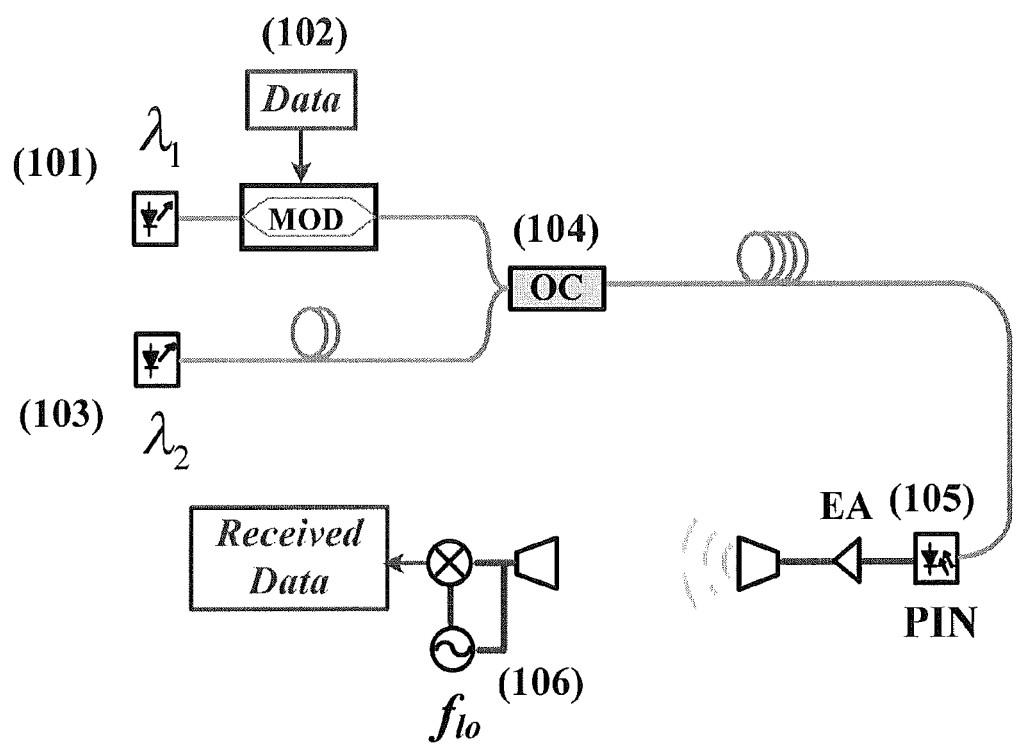
Fig. 1. Free-run Millimeter-wave signal generation

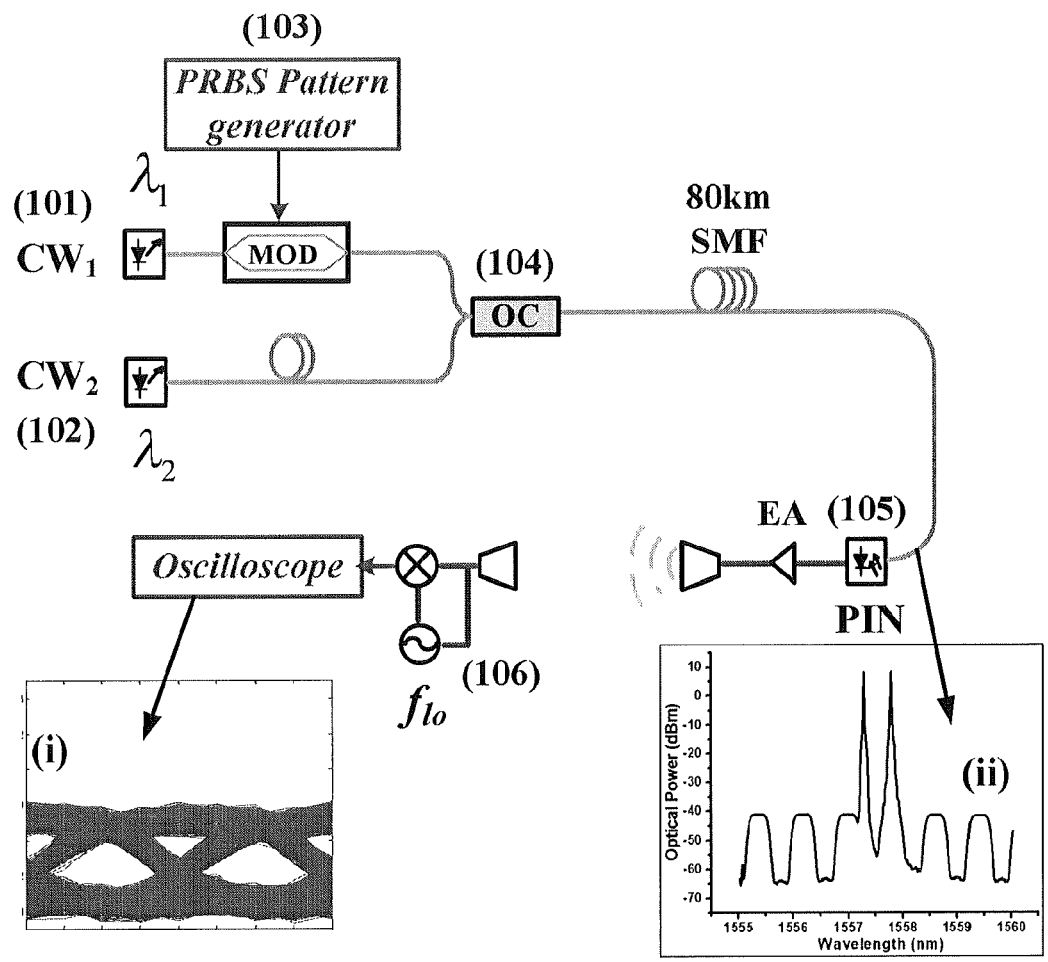
Fig. 2. The evaluation platform of free-run Millimeter-wave signal transmission

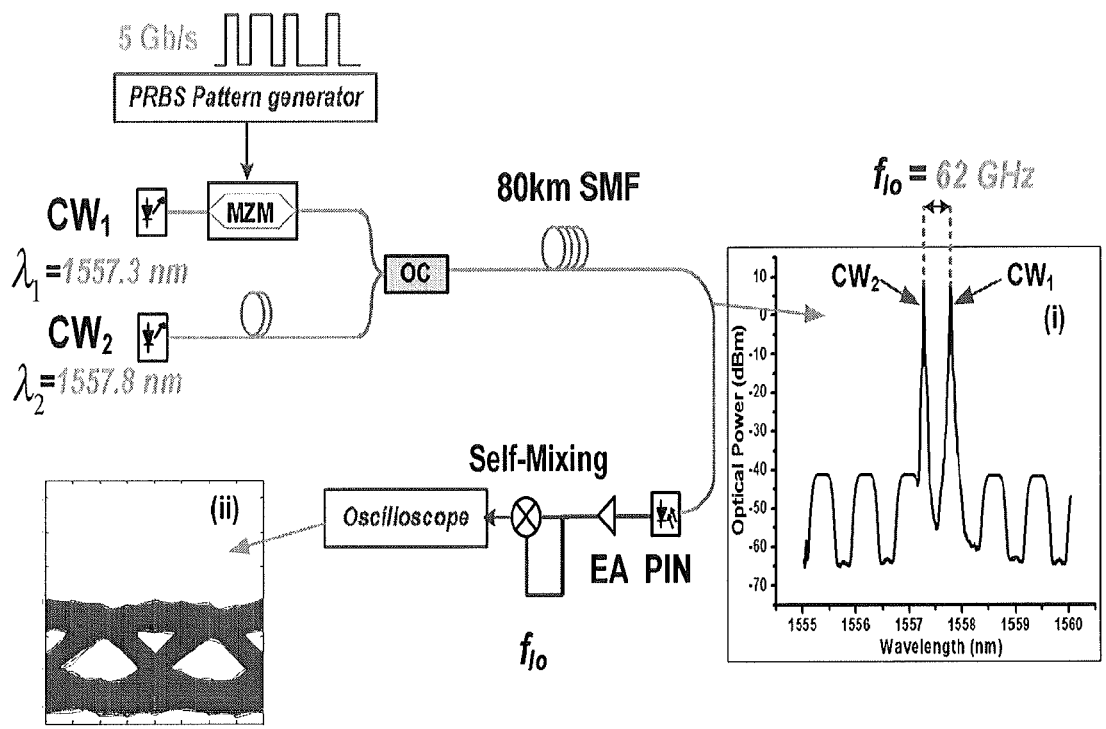
Fig. 3. The experimental setup of free-run Millimeter-wave signal transmission

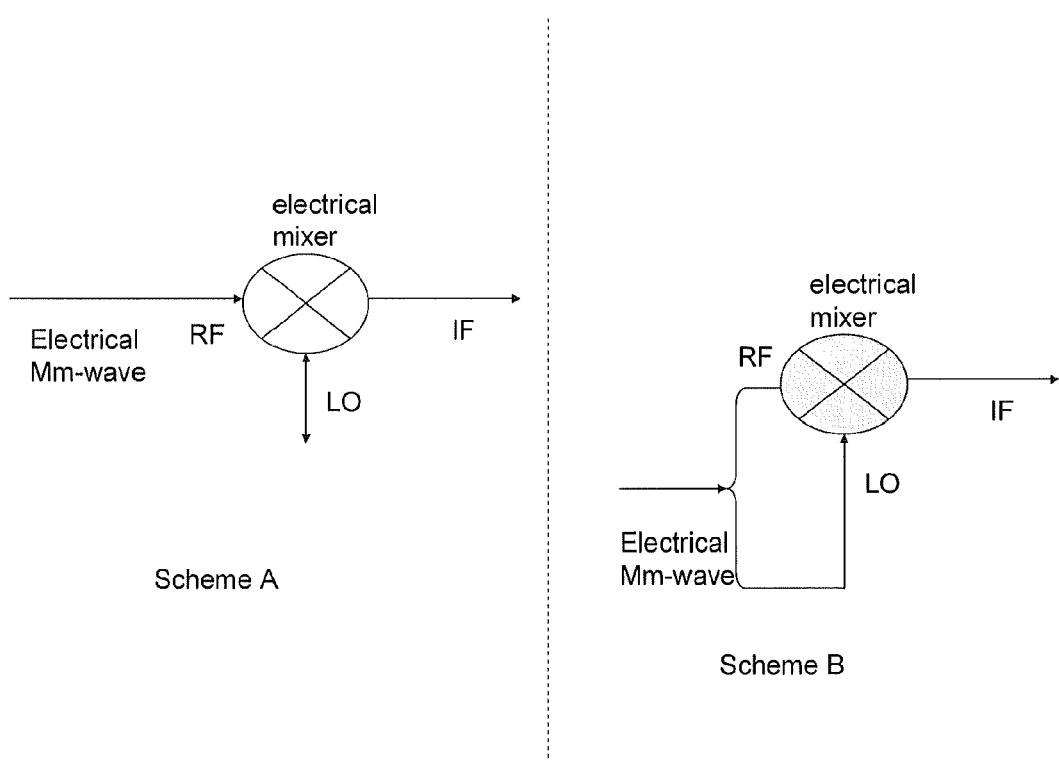
Fig. 4. Clock extraction

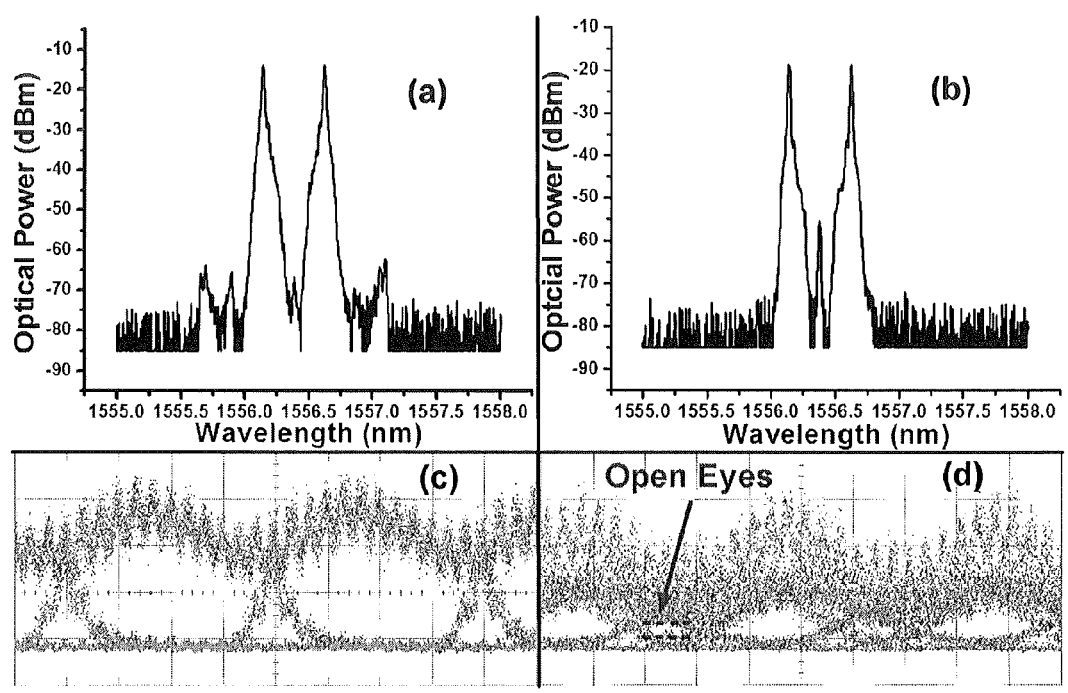
Fig. 5. Optical spectra and eye diagram of Millimeter-wave generation with OCS

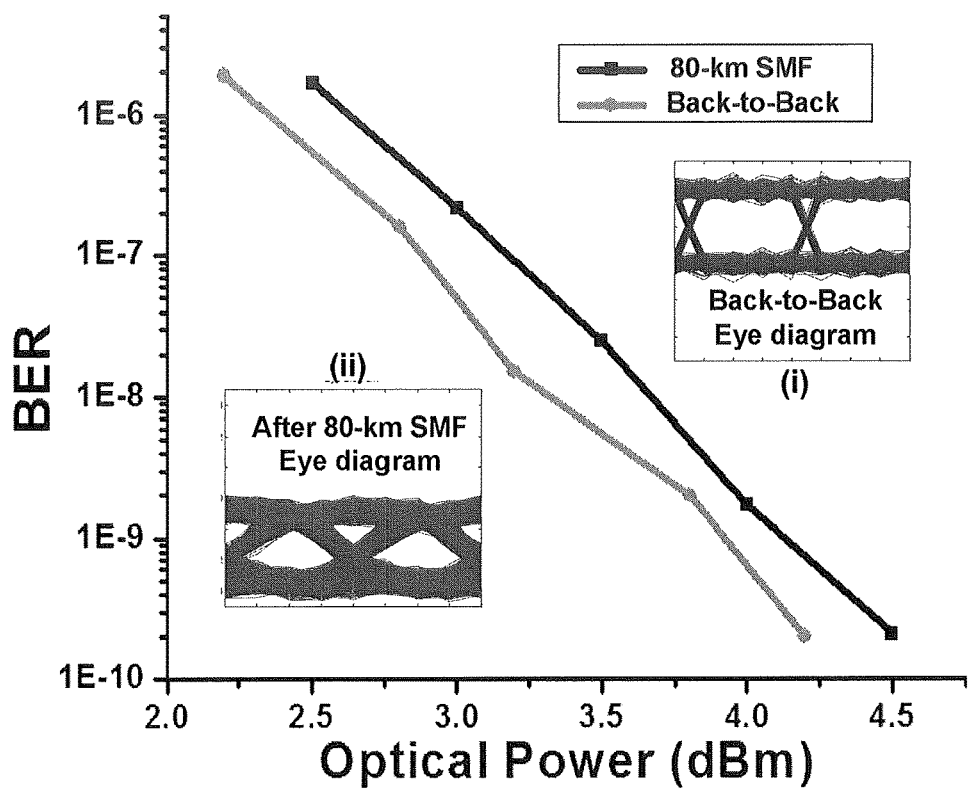
Fig. 6. Eye diagrams and bit error rate curves for certain embodiments of the present invention

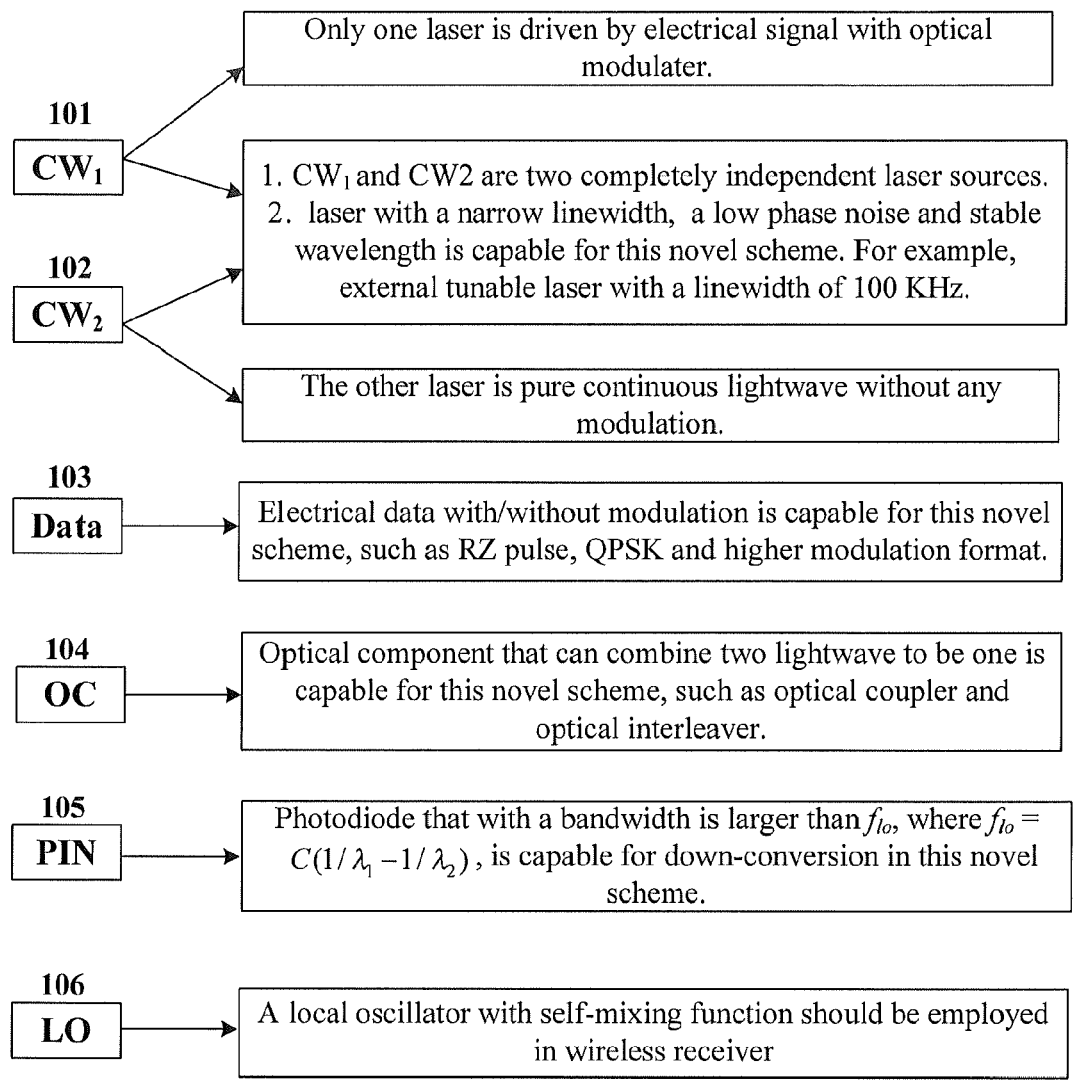
Fig. 7. Millimeter-wave signal generation

METHOD AND APPARATUS FOR OPTICAL WIRELESS ARCHITECTURE

CROSS-REFERENCE TO RELATED APPLICATIONS

This application claims priority of U.S. Provisional Application No. 61/408,005, filed Oct. 29, 2010.

FIELD OF THE INVENTION

This invention generally pertains to optical wireless architecture and in particular to a novel method and apparatus to generate millimeter-wave signals with simple and low cost architecture.

BACKGROUND

Millimeter-wave technology is a wireless technology that can provide up to multi-Gigabits per second (Gbps) wireless connectivity between electronic devices. The frequency range of millimeter-wave application is significantly higher than those used for FM radio. Millimeter-wave technology can exploit unregulated bandwidth that is available worldwide and with better efficiency and security than traditional wireless LAN frequencies. In addition, higher frequencies mean shorter wavelengths. As a result, the antenna systems can be millimeter size. However, the electrical distribution of such millimeter-wave-band radio frequency signals over air is limited due to the high transmission loss.

Millimeter-wave radio-over-fiber (RoF) techniques and systems are drawing more and more research and commercial interest in part due to the seamless integration of huge transmission bandwidth with optical fiber communication and flexible wireless access provided by optical fiber and high-frequency RF carriers: (W. Jian et al., "Energy-Efficient Multi-Access Technologies for Very-High-Throughput Avionic Millimeter Wave, Wireless Sensor Communication Networks," IEEE J. of Lightw. Technol., Vol. 28, No. 16, pp. 2398-2405, Aug. 15, 2010); (G. Chang et al., "Broadband Access Technologies for Very High Throughput Wireless Sensor Communication Networks," IEEE Radio and Wireless Symposium'09, January 2009).

Photonic generation and up-conversion of millimeter-wave signals play important roles in millimeter-wave system design: (A. Wiberg et al., "Fiber-optic 40 GHz Millimeter-wave link with 2.5 Gb/s data transmission," IEEE Photon. Technol. Lett., vol. 17, no. 9, pp. 1938-1940, September 2005); (H. Song et al., "Error-free simultaneous all-optical upconversion if WDM radio-over-fiber signals," IEEE Photon. Technol. Lett., vol. 17, no. 8, pp. 1731-1733, August 2005).

The traditional schemes of millimeter-wave signal generation, such as double-sideband (DSB) and optical carrier suppression (OCS), experience a performance-fading problem and a limitation of transmission distance. As a result, the typical DSB millimeter-wave signal suffers severe deterioration after 40-km single-mode-fiber (SMF) transmission.

In (J. Yu et al., "Optical Millimeter-Wave Generation or Up-Conversion Using External Modulators," IEEE Photon. Technol. Lett., vol. 18, no. 1, pp. 265-267, January 2006), the generated or up-converted optical millimeter wave using OCS modulation scheme shows high receiving sensitivity, high spectra efficiency, and small power penalty. However, uneven amplitudes of optical carrier at 40 GHz after 40-km SMF transmission caused by fiber dispersion are also experienced. After 60-km SMF transmission, due to fiber dispersion and large carrier-to-sideband ratio (CSR), the eye diagram is almost closed. Furthermore, more components are adopted for millimeter-wave generation by using DSB or OCS. For example, an extra local oscillator is required for up-conversion.

Millimeter-wave signals are generally generated with a single-sideband (SSB) scheme. However, the typical millimeter-wave generation with SSB is complex. For example, an extra optical modulator or interleaver is employed in a SSB scheme. In (J. Yu et al., "A Novel Scheme to Generate Single-Sideband Millimeter-Wave Signals by Using Low-Frequency Local Oscillator Signal," IEEE Photonics Technology Letters, vol. 20, no. 7, pp. 478-480, Apr. 1, 2008), for example, millimeter-wave is generated by using SSB modulation with a low-frequency local oscillator. Moreover, an additional external optical filter or interleaver is deployed to filter out the first-order modes, which makes the generation scheme more costly.

SUMMARY OF THE INVENTION

Briefly, the present invention describes a method of millimeter-wave signal generation that includes driving a continuous lightwave by a data signal and a modulator resulting in a data sideband signal and then combining the data sideband signal and another continuous lightwave by an optical coupler to generate a millimeter-wave signal having two non-phase-locked sidebands. The data signal is an electrical data signal optionally implementing a non-return-to-zero binary pulse modulation format or a quadrature phase shift keying modulation format, among others. Preferably, the first continuous lightwave has a wavelength of $\lambda_1$, the second continuous lightwave has a wavelength of $\lambda_2$, and the photodiode has a bandwidth larger than $f_{lo}$, where $f_{lo} = C(1/\lambda_1 - 1/\lambda_2)$ and $C = 3.8 \times 10^8$. The method further includes detecting, by a photodiode achieving optical to electrical conversion, the generated millimeter-wave signal and then transmitting a corresponding high-frequency radio signal.

The present invention also describes a method of millimeter-wave signal reception that includes receiving a high-frequency radio signal that corresponds to a millimeter-wave signal having two non-phase-locked sidebands and then down-converting by a local oscillator the radio frequency signal to its baseband form. Optionally, the local oscillator has a self-mixing function.

Embodiments of the present invention also describe a millimeter-wave signal generator that includes means for driving a continuous lightwave that result in a sideband data signal and means for optically combining the sideband data signal and another continuous lightwave that result in a millimeter-wave signal having two non-phase-locked sidebands. The data signal is an electrical data signal optionally implementing a non-return-to-zero binary pulse modulation format or a quadrature phase shift keying modulation format, among others. Preferably, the first continuous lightwave has a wavelength of $\lambda_1$, the second continuous lightwave has a wavelength of $\lambda_2$, and the means for detecting has a bandwidth larger than $f_{lo}$, where $f_{lo} = C(1/\lambda_1 - 1/\lambda_2)$ and $C = 3.8 \times 10^8$. The method further includes means for detecting the generated millimeter-wave signal that achieves optical to electrical conversion and means for transmitting a radio frequency signal that corresponds to the generated millimeter-wave signal.

The present invention also describes a millimeter-wave signal receiver that includes means for receiving a radio frequency signal corresponding to a millimeter-wave signal that has two non-phase-locked sidebands and means for down-converting the radio frequency signal to its baseband form. Optionally, the means for down-converting has a self-mixing function.

Embodiments of the present invention also describe a millimeter-wave signal generator that includes a modulator configured to drive a continuous lightwave by a data signal and then output a data sideband signal, and an optical coupler configured to combine the data sideband signal and another continuous lightwave and then output a millimeter-wave signal having two non-phase-locked sidebands. The data signal is an electrical data signal optionally implementing a non-return-to-zero binary pulse modulation format or a quadrature phase shift keying modulation format, among others. Preferably, the first continuous lightwave has a wavelength of $\lambda_1$, the second continuous lightwave has a wavelength of $\lambda_2$, and the photodiode has a bandwidth larger than $f_{lo}$, where $f_{lo}=C(1/\lambda_1-1/\lambda_2)$ and $C=3.8\times10^8$. The signal generator further includes a photodiode configured to detect the millimeter-wave signal and achieve optical to electrical conversion and a high-frequency antenna for transmitting a corresponding radio signal.

The present invention also describes a millimeter-wave signal receiver that includes a high-frequency antenna for receiving a radio signal corresponding to a millimeter-wave signal having two non-phase-locked sidebands and a local oscillator configured to down-convert the radio signal to its baseband form. Optionally, the local oscillator has a self-mixing function.

BRIEF DESCRIPTION OF THE DRAWINGS

A more complete understanding of the present invention may be realized by reference to the accompanying drawings:

FIG. 1 schematically illustrates a system and process for free-run millimeter-wave signal generation.

FIG. 2 schematically illustrates a system and process for an evaluation platform of free-run millimeter-wave signal transmission.

FIG. 3 schematically illustrates a system and process for an experimental setup of free-run millimeter-wave signal transmission.

FIG. 4 shows two configurations for clock extraction.

FIG. 5 shows optical spectra and an eye diagram of millimeter-wave generation with OCS.

FIG. 6 shows eye diagrams and bit error rate curves.

FIG. 7 is a chart depicting a process for millimeter-wave signal generation.

Embodiments of the present invention will now be described more fully hereinafter with reference to the accompanying drawings, in which some examples of embodiments of the inventions are shown. Indeed, these inventions may be embodied in many different forms and should not be construed as limited to the embodiments set forth herein; rather, these embodiments are provided by way of example to satisfy applicable legal requirements. Like numbers refer to like elements throughout.

DETAILED DESCRIPTION OF THE PREFERRED EMBODIMENTS

FIG. 1 shows millimeter-wave signal generation according to embodiments of the present invention. Heterodyne mixing of two free run lightwaves is utilized. For example, two continuous lightwaves ($CW_1$ and $CW_2$) with a narrow linewidth of 100 kHz are adopted to generate the two side-bands of millimeter-wave signal, rather than the traditional one that uses optical carrier suppression (OCS) by additional modulator (MOD) or optical interleaver.

$CW_1$ 101, with a wavelength of $\lambda_1$, is driven by electrical data 102 with MOD as one of the side-bands of the millimeter-wave signal. $CW_2$ 103, with a wavelength of $\lambda_2$, is a pure continuous lightwave without any modulation as the other side-band of the millimeter-wave signal.

$CW_1$ and $CW_2$ are combined together by an optical coupler (OC) 104 to achieve millimeter-wave signal generation. As such, it is more flexible and feasible to generate any millimeter-wave in large frequency ranges. The two side-bands of the millimeter-wave signal are completely non-phase-locked with a random phase difference between them. In certain embodiments of the present invention, the relative frequency drifting between the two lightwaves will change the frequency of the millimeter-wave. Therefore, self-mixing is used to realize millimeter-wave down conversion with stable operation.

At the wireless transmitting side, the millimeter-wave signal is detected by a photodiode (PIN) 105 to achieve optical to electrical (O/E) conversion. After PIN, the millimeter-wave is transmitted through an air-link by a high-frequency antenna. At the receiving side, a local oscillator (LO) with self-mixing architecture 106 is used to down-convert the radio frequency (RF) to its baseband form. In certain embodiments of the present invention, by self-mixing, for example, the frequency drifting between the RF signals and LO can be substantially eliminated.

FIG. 2 shows an evaluation platform of free-run millimeter-wave signal generation as disclosed herein. The bit rate of data from the pseudorandom bit sequence (PRBS) pattern generator is 5 Gb/s. The optical spectrum is shown as insert (i) and the frequency of RF signal could be calculated as $f_{lo}=C(1/\lambda_1-1/\lambda_2)$, where $C=3.8\times10^8$. In the FIG. 2 demonstration, $f_{lo}=62.5$ GHz. Because the signal is with a binary non-return-to-zero (NRZ) signal, the right side-band which carries the PRBS data after is broadened is illustrated in insert (ii) other than left one. Insert (i) shows the eye diagram of received PRBS data after 80-km SMF transmission.

Similarly, FIG. 3 shows an experimental setup of an embodiment of the present invention. A 5-Gb/s binary signal carried on 62.5 GHz optical millimeter wave was transmitted over 80-km SMF-28. A wavelength-stable continuous-wave lightwave ($CW_1$) with a narrow linewidth of 100 kHz is generated by a tunable laser at 1557.3 nm, for example, and then modulated by a Mach-Zehnder modulator (MZM) driven by a 5-Gb/s NRZ binary signal. The 5-Gb/s NRZ signal is generated by PRBS pattern generator with a length of $2^{11}$.

Another pure continuous-wave lightwave ($CW_2$) is also generated by a wavelength-stable laser at 1557.8 nm with a narrow linewidth of 100 kHz. No phase lock between $CW_1$ and $CW_2$ is utilized. These lightwaves have equivalent optical power and random phase noise between them. The frequency stability of the laser is within 100 MHz.

After OC, the millimeter-wave RoF signal with two side-bands consists of $CW_1$ (the right side-band) and $CW_2$ (the left side-band). The optical spectrum of the millimeter-wave RoF signal is shown in FIG. 3 as insert (ii). After 80-km SMF transmission, the millimeter-wave RoF signal is detected by a PIN with a bandwidth of 70 GHz and then achieves O/E conversion. Because the 5 Gb/s based signal is carried on the right side-band, the right side-band is wider as illustrated in insert (i) other than left one.

As before, the frequency of RF signal could be calculated as $f_{lo}=C(1/\lambda_1-1/\lambda_2)$, where $C=3.8\times10^8$. In the demonstration shown in FIG. 3, $f_{lo}$=62 GHz. The millimeter-wave RF signal is amplified by an electrical amplifier (EA) with a bandwidth of 10 GHz. A LO with self-mixing function is deployed for down-conversion at the receiver.

Clock extraction is realized in an electrical mixer. The extraction clock is used as the LO. This LO is used to downconvert the millimeter-wave signal. The LO extraction has two configurations as shown FIG. 4. In Scheme A, the LO port in the electrical mixer has no terminator. The RF is reflected from this port, and clock is extracted in the electrical mixer. In Scheme B, the millimeter-wave is divided into two parts. The first part is connected to the RF port in the electrical mixer, and the second part is connected to the LO port in the electrical mixer. The RF cable to the LO and RF ports should be matched to get the optimal output intermediate frequency (IF) signal.

Finally, the down-converted PRBS signal is sampled and recorded by a high-bandwidth (16.5 GHz) oscilloscope operating at a sample rate of 40 GS/s. The eye diagram of received PRBS signal is shown in FIG. 3 as insert (ii). As is shown, the millimeter-wave error-free transmission over 80-km SMF is realized by using free-running generation scheme.

The significant improvement of free-running scheme is illustrated by a comparison to conventional generation schemes with DSB and OCS. Typical millimeter-wave signals generated by using DSB or OCS shows an impassable limitation at fiber transmission distance because of fiber chromatic dispersion, for example.

The optical spectra of back-to-back (B-t-B) and 80-km transmission with OCS are shown in FIGS. 5(a) and 5(b), respectively. The carrier is suppressed more than 30 dB by using an optical interleaves. The data format carried by two-sidebands is also NRZ binary pulse for a precise comparison between free-running scheme and others. FIG. 5(c) shows the eye diagram of RoF signal B-t-B transmission. After 80-km SMF transmission, the eye diagram shown in FIG. 5(d) is almost closed because of the walk-off effect of two-sidebands induced by fiber dispersion.

The bit error rate (BER) performances of millimeter-wave over RoF system by using free-running generation is measured and shown in FIG. 6. The error-free (BER=$2\times10^{-10}$) optical transmitting powers of B-t-B transmission and 80-km SMF transmission are +4.2-dBm and +4.5-dBm, which indicates the optical power penalty is only around 0.3 dB. The eye diagrams of B-t-B and 80-km SMF transmission are shown in FIG. 6 as inserts (i) and (ii) at an optical transmitting power of +4.5-dBm.

Thus, according to certain embodiments of the present invention, millimeter-wave generation utilizes optical heterodyne mixing two free-running continuous-waves and self-mixing down-conversion without any frequency locker by successfully demonstrating particular error-free transmission of 5-Gb/s PRBS data over 80-km SMF in RoF system. The chromatic dispersion tolerance of millimeter-wave signal over RoF system is significantly promoted by proposed simple and low-cost free-running generation scheme. The optical receiver sensitivities at BER=2 10-10 of particular millimeter-wave signal are +4.2-dBm (B-t-B) and +4.5-dBm (80-km SMF).

FIG. 7 generally provides a chart describing millimeter-wave signal generation according to certain embodiments of the present invention.

The foregoing descriptions illustrate and describe certain embodiments of the present invention. It is to be understood that the invention is capable of use in various other combinations, modifications, and environments; and is capable of changes or modifications within the scope of the inventive concept as expressed herein, commensurate with the above teachings and/or skill or knowledge in the relevant art.

The embodiments described hereinabove are further intended to explain best modes known of practicing the invention and to enable others skilled in the art to utilize the invention in such, or other, embodiments and with the various modifications required by the particular applications or uses of the invention. Further, it should be understood that the methods and systems of the present invention are executed solely employing machines and apparatus including simple and complex computers.

Adaptations of known systems and methods that are apparent to those skilled in the art based on the description of the invention contained herein are within the scope of the claims. Moreover, later-invented or -developed equipment that carries out the methods and/or combination elements set forth in the claims are within the scope of the invention. Accordingly, the description is not intended to limit the invention to the form or application disclosed herein. All the publications cited herein are incorporated by reference in their entirety in the present application.

What is claimed:

1. A method of millimeter-wave signal generation and reception, comprising:
    heterodyne mixing of a first continuous lightwave (CW1) and a second continuous lightwave (CW2) by
        driving a first continuous lightwave (CWi), generated at a first frequency fi, by a data signal and a modulator resulting in a single data sideband signal wherein the data signal is an electrical data signal implementing one of a non-return-to-zero binary pulse modulation format and a quadrature phase shift keying modulation format and a quadrature phase shift keying modulation format;
        combining, by an optical coupler, the resulting single data sideband signal and a second continuous lightwave (CW2) generated independently of CWi at a frequency f2 different than fi, resulting in a millimeter-wave signal, said millimeter-wave signal having a first sideband carrying the data signal and a second sideband wherein the first sideband and the second sideband are non-phase-locked and have equivalent optical power and random phase noise and random frequency drift between them and the first sideband is wider than the second sideband;
    detecting the millimeter-wave signal by a photodiode, wherein the photodiode achieves optical to electrical conversion;
    transmitting a radio frequency signal corresponding to the millimeter-wave signal by a first high-frequency antenna;
    receiving the radio frequency signal corresponding to the millimeter-wave signal by a second high-frequency antenna, said millimeter-wave signal being a heterodyne of a signal having two bands, a first sideband carrying a data signal and a second sideband wherein the first sideband and the second sideband are non-phase-locked and have equivalent optical power and random phase noise and random frequency drift between them and the first sideband is wider than the second sideband,
    wherein the radio frequency signal comprises two radio frequency sidebands, one radio frequency sideband corresponds to the first sideband of the millimeter-wave signal and another radio frequency sideband corresponds to the second sideband of the millimeter-wave signal; and down-converting the radio frequency signal to its baseband form by a local oscillator function, wherein the local oscillator function is achieved through self-mixing the radio frequency signal used to down-convert the millimeter-wave signal, wherein the millimeter lightwave signal has a first part that is connected to a radio frequency port in an electrical mixer and a second part that is connected to a local oscillator port in the electrical mixer, and wherein the first continuous lightwave has a wavelength of $\lambda 1$, the second continuous lightwave has a wavelength of $\lambda 2$, and the photodiode has a bandwidth larger than $f_{lo}$ where $f_{lo}=C(1/\lambda 1-1/\lambda 2)$ and $C=3.8\times 10^8$.

* * * * *